US006741567B1

United States Patent
Klein

(10) Patent No.: US 6,741,567 B1
(45) Date of Patent: May 25, 2004

(54) METHOD AND CIRCUIT CONFIGURATION FOR ESTABLISHING DATA SIGNAL CONNECTIONS

(75) Inventor: Cornel Klein, Oberhaching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/527,117

(22) Filed: Mar. 16, 2000

Related U.S. Application Data

(63) Continuation of application No. PCT/DE99/01918, filed on Jul. 1, 1999.

(30) Foreign Application Priority Data

Jul. 16, 1998 (DE) .......................................... 198 32 059

(51) Int. Cl.[7] .............................. H04J 3/16; H04J 3/22
(52) U.S. Cl. ...................... 370/237; 370/335; 370/468; 370/471
(58) Field of Search ................................ 370/352, 353, 370/354, 355, 230, 237, 356, 397, 462, 463, 468, 471

(56) References Cited

U.S. PATENT DOCUMENTS

| | | | |
|---|---|---|---|
| 5,251,209 A | * | 10/1993 | Jurkevich et al. |
| 5,463,629 A | | 10/1995 | Ko |
| 5,673,253 A | | 9/1997 | Shaffer |
| 5,706,279 A | * | 1/1998 | Teraslinna |
| 5,812,525 A | * | 9/1998 | Teraslinna |
| 6,272,110 B1 | * | 8/2001 | Tunnicliffe et al. |

OTHER PUBLICATIONS

Published International Application No. WO 97/35410 (Hou et al.) dated Sep. 25, 1997.

* cited by examiner

*Primary Examiner*—Chi Pham
*Assistant Examiner*—Afser M Qureshi
(74) *Attorney, Agent, or Firm*—Laurence A. Greenberg; Werner H. Stemer; Gregory L. Mayback

(57) ABSTRACT

Optimum use is made of a currently available data connection capacity for data signal connections between data terminals, which are connected to a circuit-switched switching center, and/or between these data terminals and a data network, in particular the Internet data network, which is connected to the switching center. For the purpose of making optimum use of the currently available transmission capacity for traffic loads on the switching center, additional transmission capacity to that which is available for normal connections is provided below a first threshold V1. If the traffic load exceeds the first threshold V1, the provision of additional transmission capacity for new data signal connections stops. If the traffic load undershoots a second threshold V2, which may be the same as the first threshold V1, additional transmission capacity for new data signal connections is provided again. If the traffic load exceeds a third threshold V3, which is above, between or below the first and second thresholds V1, V2, then, in addition to the action when the first threshold V1 is exceeded, the additional transmission capacity is removed from at least some existing connections.

16 Claims, 1 Drawing Sheet

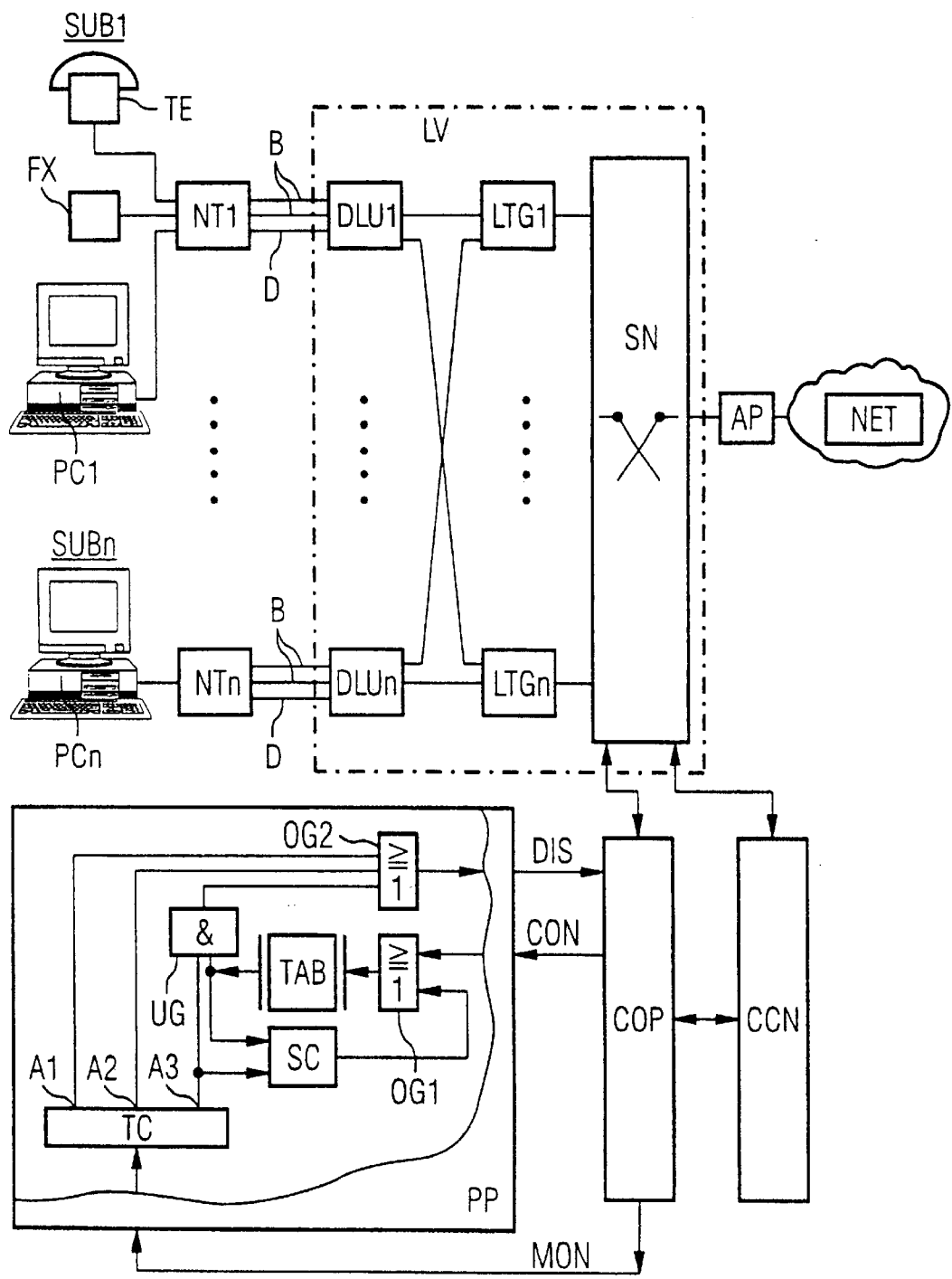

METHOD AND CIRCUIT CONFIGURATION FOR ESTABLISHING DATA SIGNAL CONNECTIONS

CROSS-REFERENCE TO RELATED APPLICATION

This is a continuation of copending International Application PCT/DE99/01918, filed Jul. 1, 1999, which designated the United States.

BACKGROUND OF THE INVENTION

Field of the Invention

The invention lies in the communications and signal processing fields. More specifically, the invention refers to a method and circuit configuration for making data signal connections between data terminals, particularly computers and PCs, which are connected to a circuit-switched switching center, and/or between these data terminals and a separate data network, in particular the Internet data network, which is connected to the circuit-switched switching center via one or more connecting nodes. The term "circuit-switched switching center" as used herein means a switching center which is appropriately designed to carry out circuit switching processes.

In the types of data signal connections considered above a transmission capacity of 56 kbit/s maximum has heretofore been usually available in analog circuit-switched networks. A transmission rate of 64 kbit/s maximum per connection has usually been available in digital circuit-switched networks. The protocol which is used for data signal transmission is mostly the so-called point-to-point protocol (PPP-RFC 1661).

To increase the transmission capacity, it is also possible in a digital circuit-switched network, in the case of an ISDN basic rate access with two B channels, to achieve a maximum transmission rate of 128 kbit/s, if both B channels are used for data signal transmission (see Protocol RFC 1717). There, two physical connections are available for the relevant data signal transmission.

The data network accesses which have been used heretofore are all based on the classical switched connection service, which was designed above all for transmission of telephone signals. This service is wherein a defined transmission bandwidth is guaranteed to a subscriber for the duration of the connection, and in that an existing connection is not in general ended from the network which is used. For this classical service, the technical implementation and dimensioning of the switching centers have been organized from the point of view of the highest availability and reliability. Very low network load is then the result of this over-dimensioning. The result would be the same if broadband switched data signal connections with the same availability and reliability were provided.

SUMMARY OF THE INVENTION

The object of the invention is to provide a method and a circuit for setting up data signal connections, which overcome the above-noted deficiencies and disadvantages of the prior art devices and methods of this kind, and which lead a way to providing the respective optimum transmission capacity for each of the data signal connections to be provided, without the network infrastructure having to be dimensioned differently from the given conditions for normal connections.

With the above and other objects in view there is provided, in accordance with the invention, a method of establishing data signal connections between data terminals (e.g. PCs) connected to a circuit-switched switching center, and/or between the data terminals and a separate data network (e.g. Internet) connected to the circuit-switched switching center via one or more connecting nodes, which comprises:

defining a normal transmission capacity in a circuit-switched switching center available for normal data signal connections;

defining a first traffic load threshold and a second traffic load threshold in the switching center (the second traffic threshold may be equal to the first traffic threshold);

if a traffic load in the circuit-switched switching center or a network including the switching center lies below the first traffic load threshold, providing additional transmission capacity for the data signal connections to be established in the switching center, in addition to the normal transmission capacity available in the switching center for the normal connections;

if the traffic load exceeds the first traffic load threshold, providing only a transmission capacity currently available for normal data signal connections for the data signal connections to be established;

after the traffic load undershoots the second traffic load threshold, providing additional transmission capacity in addition to the normal transmission capacity available for the normal connections for the data signal connections to be established.

In other words, the above objects are satisfied in that, if a traffic load below a first traffic load threshold V1 is present in the circuit-switched switching center and/or in the network which includes it, additional transmission capacity is provided for the data signal connections to be made in this switching center, in addition to the transmission capacity which is available in this switching center for normal connections (for telephone, fax, narrowband or X.25 connections). If, thereby, the above-mentioned first traffic load threshold V1 is exceeded by the relevant traffic load, only the transmission capacity which is currently available for normal connections is provided for the data signal connections which are then to be made, and in that only after the above-mentioned traffic load undershoots a second traffic load threshold V2, which at most corresponds to the first traffic load threshold V1, additional transmission capacity to that which is available for normal connections is again provided for the data signal connections which are then to be made.

The invention has the advantage that the transmission capacity which is available in the circuit-switched switching center can be made usable for data signal connections in a relatively simple way, and the usefulness which is thus created is directed at the traffic load of the relevant switching center. This means that in every case normal connections, i.e. usually telephone and fax connections or narrowband or X.25 connections, obtain the transmission capacity which they require for their signal transmission, and that only after that is additional transmission capacity provided for the data signal connections, if such capacity is still available. In this way the transmission capacity of the circuit-switched switching center is optimal, i.e. it can be exploited better than previously. It should be noted here that data applications in general are insensitive to variations or changes in the transmission capacity. It should also be noted that the method according to the invention can be used advantageously even if the first traffic load threshold V1 is set to infinity.

In accordance with an added feature of the invention, if the traffic load in the network including the circuit-switched switching center exceeds a third traffic load threshold (above, between, or below the first and second thresholds), the additional transmission capacity previously provided for data signal connections is removed from at least some existing connections.

This action, which occurs additionally to the action which was taken when the first traffic load threshold V1 was exceeded, has the advantage that, as the traffic load in the circuit-switched switching center increases, the normal connections to be set up there can be given priority in every case over the data signal connections with increased data transmission capacity. In the case that the third traffic load threshold V3 is between or below the first and second traffic load thresholds V1, V2, the resulting advantage is that additional transmission capacity can be provided for new data signal connections relatively quickly, after it has been removed from existing data signal connections. If the third traffic load threshold V3 is below the second traffic load threshold V2, the resulting advantage is a purely precautionary removal of additional transmission capacity which was previously provided.

In accordance with an additional feature of the invention, the additional transmission capacity for data signal connections is removed selectively in dependence on a relevant connection duration and/or of subscriber data of the data terminals participating in the connection. This means that the additional transmission capacity is removed taking into account the relevant connection duration and/or the subscriber data of the data terminals participating in the data signal connection. In this way the additional transmission capacity can be removed advantageously according to criteria which can be predefined, e.g. after a specified time interval, and if appropriate even without taking account of the traffic load.

Appropriately to the purpose, to distinguish data signal connections from normal connections within the circuit-switched switching center, a separate connection class signal, which can be analyzed, is output in the course of making the relevant data signal connections. In this way it is particularly easy to distinguish data signal connections from normal connections, and to control the action which was considered above, of removing additional transmission capacity which was provided for such connections.

With the above and other objects in view there is also provided, in accordance with the invention, a circuit configuration for implementing the above-outlined method. The circuit comprises:

an analysis and control device connected to a circuit-switched switching center, the analysis and control device receiving from the circuit-switched switching center information about a provision of additional transmission capacity for new data signal connections in the switching center and/or between the switching center and a separate data network, and receiving load information about a traffic load of the relevant switching center and/or of the network including the switching center;

a control device connected to an output of the analysis and control device, the control device controlling connections of the relevant switching center and outputting a control signal to the relevant switching center only when a transmission capacity exceeds a first traffic load threshold, the control signal causing the data signal connections to be made with only the transmission capacity available for normal connections, and the control device outputting a further control signal when the traffic load undershoots a second traffic load threshold for making available additional transmission capacity to the traffic capacity available for normal connections for the data signal connections then to be made.

To implement the method according to the invention, the circuit configuration which is used is preferably wherein an analysis and control device is connected to the circuit-switched switching center and, at its input, obtains from the circuit-switched switching center information about the provision of additional transmission capacity for new data signal connections in the relevant switching center and/or between the latter and the separate data network, and load information about the traffic load of the relevant switching center and/or of the network which includes it, and, at its output, is connected to a control device, used to control the connections of the relevant switching center, and outputs a control signal, upon which only the transmission capacity which is available for normal connections at the time is provided for data signal connections which are then to be made, to this control device only when a defined first traffic load threshold V1 is exceeded by the above-mentioned traffic load, and outputs a control signal only when the above-mentioned traffic load undershoots a second traffic load threshold V2, which at most corresponds to the first traffic load threshold V1 upon which control signal outputting 5 operation additional transmission capacity to that which is available for normal connections is again to be provided for the data signal connections which are then to be made. This circuit configuration is characterized by an overall relatively small circuit construction required in the above-mentioned analysis and control device to output control signals to the control device which controls the switching center on the basis of the current traffic load, whereupon the control device enables or prevents the provision of additional transmission capacity for the data signal connections to be made. It should also be noted here that the above-mentioned network, the traffic load of which is taken into account, includes not only the above-mentioned switching center and possibly the data network, but also other parts of the network which are involved in data signal connections, such as the connecting nodes which are connected to the data network, and individual connecting routes.

Appropriately to the purpose, when a traffic load which exceeds a third traffic load threshold V3, which is either above or between or below the first and second traffic load thresholds V1, V2, occurs in the circuit-switched switching center, the analysis and control device outputs a control signal, which causes the removal of additional transmission capacity which was provided for previously existing data signal connections from at least some of these data signal connections, to the control device which is used to control the connections of the switching center. This has the advantage of a particularly low circuit cost to provide the transmission capacity, which would otherwise be missing, for the normal connections even in the case of increasing traffic load in the circuit-switched switching center.

Advantageously, the analysis and control device contains a memory device (table) which holds data about the data signal connections for which additional transmission capacity has been provided in the circuit-switched switching center and whose data can be used in the removal of additional transmission capacity in the relevant switching center for the data signal connections in question. This has the advantage that the required removal of additional transmission capacity can be effected at particularly low total circuit cost, without extensive intervention in the control device of the circuit-switched switching center being necessary.

The analysis and control device preferably contains a selection device which can output control signals which are used for the removal of additional transmission capacity in the circuit-switched switching device according to defined criteria (connection duration, subscriber data). This has the advantage of a relatively low circuit cost to remove additional transmission capacity according to preset criteria.

Alternatively to the implementation option which is considered above, the analysis and control device is suitably integrated in the control device which controls the circuit-switched switching center. This has the advantage of a particularly low total circuit cost for implementation of the circuit configuration according to the invention.

Other features which are considered as characteristic for the invention are set forth in the appended claims.

Although the invention is illustrated and described herein as embodied in a method and circuit configuration for making data signal connections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole drawing FIGURE is a schematic and block diagram of a system according to the invention.

DESCRIPTION OF THE PREFERRED EMBODIMENT

Referring now to the sole FIGURE of the drawing in detail there is seen a diagram of a circuit-switched switching center LV, as it is used commercially, for instance under the name "EWSD" (digital electronic switching system). Such switching centers are described in various publications. However, other circuit-switched switching centers can also be used. The switching center LV may belong to a circuit-switched network which includes a plurality of corresponding switching centers. The circuit-switched switching center LV which is shown schematically in the drawing has, in this case, a series of digital subscriber line units DLU1 to DLUn, which are connected via line termination groups LTG1 to LTGn to a switching network SN. The digital subscriber line units DLU1 to DLUn have multiple connections to the line termination groups LTG1 to LTGn, in such a way that each of the digital subscriber line units DLU1 to DLUn is connected to each of the line termination groups LTG1 to LTGn.

The circuit-switched switching center LV is also connected to a control device, which here consists of two partial control devices COP and CCN. The partial control device COP is a so-called coordination processor, which is used for actual connection control within the circuit-switched switching center LV. This coordination processor COP works with the other partial control device CCN, a signaling network control device, which is used to process the signaling characters via a central signaling channel. The procedures associated with this within the circuit-switched switching center LV which has been considered up to now have already been described in various other places, and will therefore not be considered further here.

Subscriber stations SUB1 to SUBn, in this case digital subscriber stations, are connected to the circuit-switched switching center LV. The subscriber station SUB1, for instance, contains a digital telephone terminal TE, a fax terminal FX, and a PC or home computer PC1 with a central processor unit, monitor and keyboard. These devices are connected to the digital subscriber line unit DLU1 via a network termination device NT1, that is via two B channels and a D channel. The B channels, which are used for transmitting messages, each have a transmission capacity of 64 kbit/s, and the D channel, which is used for signaling purposes, has a transmission capacity of 16 kbit/s.

The subscriber station SUBn, which is also shown in the drawing, is, for instance, in the form of a single computer or PC or home computer PBn, also with central processor unit, monitor and keyboard, and is connected to its associated digital subscriber line unit DLUn via a network termination device NTn, via two B channels and a D channel.

It should be noted here that not only operation with digital terminals connected to the circuit-switched switching center LV is possible. Rather, operation with analog subscriber devices or terminals which are connected via appropriately equipped subscriber line units is also possible. In the case of data terminals, i.e. computers or PCs, modems are then provided in the relevant access connections.

A data network NET is connected to the circuit-switched switching center LV considered above, or to a circuit-switched network which includes this switching center, via an access device AP which is designated as a connecting node. The data network may be, for instance, the Internet data network, to which a multiplicity of computers are connected, to which access from data terminals PC1 to PCn, which are connected to the circuit-switched switching center LV, is desired. This will be explained in more detail below.

The circuit configuration shown in the drawing FIGURE also includes an analysis and control device PP, the structure of which is shown in principle. The control device PP is connected to the control device used to control the connections of the switching center LV, or more precisely to the coordination processor COP, and which can be integrated into the latter and/or into the signaling network control unit CCN which is connected to it.

The analysis and control device PP is connected in this case via three lines CON, MON and DIS to the coordination processor COP of the circuit-switched switching center LV. Each of these lines may be in the form of a bus line with a multiplicity of individual lines.

Via the line marked CON, the analysis and control device PP obtains from the coordination processor COP information about the establishment of new data signal connections, for which additional transmission capacity to that which is available for normal connections has been provided. The relevant information includes data about the relevant data signal connections and/or the associated data terminals. The information is fed to the input side of a memory or table TAB, and is held there, via an OR circuit, which is represented by an OR gate OG1.

The line marked MON is a monitoring line. The analysis and control device PP is connected to the coordination processor COP via the line MON and it obtains information via the line about the current traffic load of the circuit-switched switching center LV and/or of the network which includes it. In some circumstances it may receive further structured information, e.g. about individual routes. The traffic load information is analyzed in a threshold circuit TC in the analysis and control device PP on the basis of first, second and third thresholds, whereupon control signals that are adjusted according to current circumstances are output from outputs A1, A2 and A3 of the threshold circuit TC. The control signals are output via an OR circuit, which is represented by an OR gate OG2, to the line marked DIS, and via DIS to the coordination processor COP. The coordination processor then controls appropriate actions in the circuit-switched switching center LV or in the network which includes it, as will be seen below. If required, the relevant control signals are output, with the data contained in the table TAB, via an AND gate UG and the above-mentioned OR circuit to the above-mentioned line DIS, under the control of a selection circuit SC. An input of the selection circuit SC is connected to the output side of the table TAB and to the output A3 of the threshold circuit TC, and an output is connected via the OR circuit, which is represented by the OR gate OG1, to the input side of the table TAB.

The foregoing describes the basic structure of the circuit configuration which is shown in the drawing. The following explanation pertains to its function, namely the way it works to establish data signal connections between the data terminals, i.e. the computers or PCs PC1 to PCn, which are connected to the circuit-switched switching center LV, and the data network NET, in particular the Internet data network, which is connected via the connecting node AP to the relevant switching center LV. So that such data signal connections can be distinguished from normal connections in the switching center LV a connection class signal, which can be analyzed in the control device(s) COP, CCN, is preferably output by the appropriate data terminal when each of the relevant data signal connections is made.

If data signal connections are made by the above-mentioned data terminals when the traffic load of the switching center LV and/or of the network which includes it is normal, then, in addition to the transmission capacity which is available for normal connections in this switching center, i.e. the transmission capacity of a B channel, additional transmission capacity, i.e. the transmission capacity of a further B channel, is also provided for these data signal connections. It should be noted here that, in the case that the network terminating devices NT1 to NTn are in the form of or replaced by multiple-channel access devices, which are capable of providing a transmission capacity of up to that of 30 B channels for the subscriber station, in practice the relevant additional transmission capacity can be provided from this transmission capacity in the given instance. If such additional B channels are provided for the individual data signal connections, this happens in the switching center LV in the form of corresponding separate physical connections.

A further alternative is well within the purview of the invention, namely, a network access which makes it possible to change the transmission capacity of a transmission channel dynamically.

The data signal connections for which additional transmission capacity beyond the transmission capacity for normal connections is provided are held in the table TAB of the analysis and control device PP.

If the traffic load in the circuit-switched switching center LV or in the network including it exceeds the first traffic load threshold V1, this sets the threshold circuit TC in the analysis and control device PP and outputs a corresponding control signal from its output A1, via the OR circuit which is represented by the OR element OG2, via the line DIS to the coordination processor COP. Subsequently, if new data signal connections are to be made, no additional transmission capacity is made available to them. This is because such transmission capacity is reserved for normal connections (for telephone subscriber stations, fax terminals, or for narrowband or X.25 connections). However, the additional transmission capacity which was previously provided for data signal connections is retained by these connections.

If the traffic load of the circuit-switched switching center LV and/or the network which includes it once more undershoots a second traffic load threshold V2, which, in the preferred embodiment, lies below the above-mentioned first traffic load threshold V1, but if required may be equal to the first traffic load threshold V1, the threshold circuit TC, which is included in the analysis and control device PP, outputs a corresponding control signal from output A2 via the OR circuit which is represented by the OR element OG2 to the line DIS and via that to the coordination processor COP. The coordination processor COP subsequently again provides transmission capacity, in addition to that which is available for normal connections, for new data signal connections to be made.

If the traffic load of the circuit-switched switching center LV and/or of the network which includes it exceeds a third traffic load threshold V3, which is either above the first and second traffic load thresholds V1 and V2 or between or even below these traffic load thresholds V1, V2, the following processes occur in addition to the described action when the first traffic load threshold is exceeded.

The threshold circuit TC, which is included in the analysis and control device PP, outputs from its output A3 a control signal to the AND element UG, which is included in the relevant device, and to the selection circuit SC, which thus activates the table TAB via the OR circuit which is represented by the OR element OG1. From the table TAB, data about the data signal connection(s) from which additional transmission capacity which was previously provided for them is to be removed is output via the AND element UG and the OR circuit which is represented by the OR element OG2 to the line DIS, and via this to the coordination processor COP. To be able to decide from which of the relevant data signal connections the above-mentioned additional transmission capacity is to be removed, the selection circuit SC, which is provided in the analysis and control device PP, selects the data signal connections which are to be reduced with respect to additional transmission capacity according to defined criteria such as connection duration and other subscriber data. For this purpose, the selection circuit SC has previously taken relevant information regarding the individual connections from the table TAB. In this case, this takes account of the urgent need for availability of transmission capacity for normal connections (telephone subscribers, fax terminals or for narrowband or X.25 connections) in the circuit-switched switching center LV and/or in the network which includes this switching center. The individual data signal connections continue to be maintained, but from now on their transmission capacity is restricted—at least temporarily—and only the transmission capacity which is available for normal connections is provided for new data signal connections.

As explained above, in some cases it may be sensible or appropriate to put the third traffic load threshold V3 between the first and second traffic load thresholds V1 and V2. In this way, particularly in the case of V1=V3, it may be possible to achieve a fairer provision or distribution of additional transmission capacity for the individual data signal connections.

Through the actions described above, the transmission capacity of the circuit-switched switching center LV and/or of the network which includes this switching center is thus optimally used for data signal connections between the data terminals which are connected to this switching center and/or to this network and a separate data network, such as the Internet data network, which is connected to it.

Finally, it should be noted that, while the foregoing description deals only with establishing data signal connections between data terminals that are connected to the switching center LV and the data network NET, the circuit configuration under consideration can be used similarly to establish data signal connections from the data network NET to the above-mentioned data terminals as well.

I claim:

1. A method of establishing data signal connections between data terminals connected to a circuit-switched switching center, and/or between the data terminals and a separate data network connected to the circuit-switched switching center via one or more connecting nodes, which comprises:

defining a normal transmission capacity in a circuit-switched switching center available for normal data signal connections;

defining a first traffic load threshold and a second traffic load threshold in the switching center;

if a traffic load in the circuit-switched switching center or a network including the switching center lies below the first traffic load threshold, providing additional transmission capacity for the data signal connections to be established in the switching center, in addition to the normal transmission capacity available in the switching center for the normal connections;

if the traffic load exceeds the first traffic load threshold, providing only transmission capacity currently available for normal data signal connection for the data signal connections to be established; and after the traffic load undershoots the second traffic load threshold, providing additional transmission capacity in addition to the normal transmission capacity previously provided for data signal connections form at least some existing connections available for the normal connections for the data signal connections to be established;

if the traffic load occurs in the network including the circuit-switched switching center exceeds a third traffic load threshold, removing the additional transmission capacity.

2. The method according to claim 1, wherein the defining step comprises defining the first traffic load threshold to be equal to the second traffic load threshold.

3. The method according to claim 1, which comprises defining the third traffic load threshold to lie between the first and second traffic load thresholds.

4. The method according to claim 1, which comprises defining the third traffic load threshold to lie above the first and second traffic load thresholds.

5. The method according to claim 1, which comprises defining the third traffic load threshold to lie below the first and second traffic load thresholds.

6. The method according to claim 1, which comprising removing the additional transmission capacity for data signal connections selectively in dependence on a relevant connection duration and of subscriber data of the data terminals participating in the connection.

7. The method according to claim 1, which comprises outputting an analyzable, separate connection class signal for distinguishing data signal connections from normal connections within the circuit-switched switching center on establishing the relevant data signal connections.

8. A circuit configuration for establishing data signal connections between data terminals connected to a circuit-switched switching center, and/or between the data terminals and a separate data network connected to the circuit-switched switching center via one or more connecting nodes, comprising:

an analysis and control device connected to a circuit-switched switching center, said analysis and control device receiving from the circuit switched center information about a provision of additional transmission capacity for new data signal connections in the switching center and/or between the switching center and a separate data network, and receiving load information about a traffic load of the relevant switching center and/or of the network including the switching center;

a control device connected to an output of said analysis and control device, said control device controlling connections of the relevant switching center and outputting a control signal to the relevant switching center only when a transmission capacity exceeds a first traffic load threshold, the control signal causing the data signal connections to be made with only the transmission capacity available for normal connections, and said control device outputting a further control signal when the traffic load undershoots a second traffic load threshold for making available additional transmission capacity to the traffic capacity available for normal connections for the data signal connections then to be made;

wherein when the traffic load in the circuit-switched switching center exceeds a third traffic load threshold, said analysis and control device outputs a control signal that causes the removal of the additional transmission capacity provided for previously existing data signal connections from at least some of the data signal connections, to said control device controlling the connections of the switching center.

9. The circuit configuration according to claim 8, wherein the second traffic load threshold at most corresponds to the first traffic load threshold.

10. The circuit configuration according to claim 9, wherein the third traffic load threshold lies between the first and second traffic load thresholds.

11. The circuit configuration according to claim 9, wherein the third traffic load threshold lies below the first and second traffic load thresholds.

12. The circuit configuration according to claim 9, wherein the third traffic load threshold lies above the first and second traffic load thresholds.

13. The circuit configuration according to claim 8, wherein said analysis and control device includes a memory device holding data about the data signal connections for which additional transmission capacity has been provided in the circuit-switched switching center and whose data can be used in a removal of additional transmission capacity in the relevant switching center for the respective data signal connections.

14. The circuit configuration according to claim 8, wherein said analysis and control device includes a selection circuit for outputting the control signals used for removing additional transmission capacity in the circuit-switched switching device as claimed in defined standards.

15. The circuit configuration according to claim 14, wherein the defined criteria include a connection duration and subscriber data.

16. A device for establishing data signal connections, comprising the analysis and control device according to claim 8, integrated in said control device for controlling the circuit-switched switching center.

* * * * *